US010003933B2

(12) United States Patent
De Foy et al.

(10) Patent No.: US 10,003,933 B2
(45) Date of Patent: Jun. 19, 2018

(54) METHOD AND APPARATUS FOR SYNCHRONIZING MOBILE STATION MEDIA FLOWS DURING A COLLABORATIVE SESSION

(71) Applicant: INTERDIGITAL PATENT HOLDINGS, INC., Wilmington, DE (US)

(72) Inventors: Xavier De Foy, Kirkland (CA); Milan Patel, Middlesex (GB); Kamel M. Shaheen, State College, PA (US); Debashish Purkayastha, Collegeville, PA (US); Osama Lotfallah, San Diego, CA (US); Hang Liu, North Potomac, MD (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days. days.

(21) Appl. No.: 15/402,041

(22) Filed: Jan. 9, 2017

(65) Prior Publication Data
US 2017/0118606 A1    Apr. 27, 2017

Related U.S. Application Data

(63) Continuation of application No. 14/691,121, filed on Apr. 20, 2015, now Pat. No. 9,544,127, which is a
(Continued)

(51) Int. Cl.
*H04W 4/08* (2009.01)
*H04W 56/00* (2009.01)
(Continued)

(52) U.S. Cl.
CPC ............. *H04W 4/08* (2013.01); *H04L 65/403* (2013.01); *H04L 67/10* (2013.01); *H04L 67/141* (2013.01); *H04W 56/001* (2013.01)

(58) Field of Classification Search
CPC ............... H04L 65/4015; H04L 65/403; H04L 65/4084; H04L 7/0008; H04L 65/1016;
(Continued)

(56) References Cited

U.S. PATENT DOCUMENTS 6,598,172 B1   7/2003   Van Deusen et al.
6,678,332 B1   1/2004   Gardere et al.
(Continued)

FOREIGN PATENT DOCUMENTS

EP   1 940 111      7/2008
JP   2008-167351    7/2008
(Continued)

OTHER PUBLICATIONS

Boronat et al., "Multimedia Group and Inter-Stream Synchronization Techniques: A Comparative Study," Elsevier Information Systems 34, 2009, pp. 108-131.
(Continued)

*Primary Examiner* — Paul H Masur
(74) *Attorney, Agent, or Firm* — Volpe and Koenig, P.C.

(57) ABSTRACT

A method and apparatus are described for synchronizing mobile station (i.e., wireless transmit/receive unit (WTRU)) media flows during a collaboration session. Inter-WTRU transfer request messages, flow addition request messages and session update request messages may be exchanged between a plurality of WTRUs and a session continuity control application server (SCC-AS). Each of the messages may include a session description protocol (SDP) attribute line containing time synchronization information (e.g., a presentation time offset (PTO) information element (IE), a media flow group identity (ID) and a synchronization tolerance IE). The SCC-AS may update the time synchronization information and include the updated information in messages it sends to the WTRUs, which may re-synchronize
(Continued)

their respective media flows based on the updated time synchronization information.

20 Claims, 13 Drawing Sheets

Related U.S. Application Data continuation of application No. 13/370,028, filed on Feb. 9, 2012, now Pat. No. 9,014,170.

(60) Provisional application No. 61/442,008, filed on Feb. 11, 2011.

(51) Int. Cl.
H04L 29/06 (2006.01)
H04L 29/08 (2006.01)

(58) Field of Classification Search
CPC .............. H04L 65/1063; H04L 65/1089; H04L 65/1093; H04L 67/10; H04L 67/141; H04W 4/08; H04W 56/001
See application file for complete search history.

(56) References Cited

U.S. PATENT DOCUMENTS

| | | |
|---|---|---|
| 7,693,534 B1 | 4/2010 | Lundy et al. |
| 7,743,141 B2 | 6/2010 | Wang et al. |
| 8,316,154 B2 | 11/2012 | Yoneda |
| 2004/0103430 A1 | 5/2004 | Lee et al. |
| 2005/0025180 A1 | 2/2005 | Curcio et al. |
| 2006/0002681 A1 | 1/2006 | Spilo et al. |
| 2007/0047590 A1 | 3/2007 | Curcio et al. |
| 2008/0037954 A1 | 2/2008 | Lee et al. |
| 2008/0154405 A1 | 6/2008 | Chen et al. |
| 2009/0313378 A1 | 12/2009 | Mahdi et al. |
| 2010/0107205 A1 | 4/2010 | Foti |
| 2010/0312834 A1 | 12/2010 | Doken et al. |
| 2010/0325212 A1 | 12/2010 | Mahdi |
| 2011/0099282 A1 | 4/2011 | Pascual Avila et al. |
| 2011/0173292 A1 | 7/2011 | Patel et al. |
| 2011/0196973 A1 | 8/2011 | Shaheen et al. |
| 2011/0205937 A1 | 8/2011 | Patel et al. |
| 2011/0216701 A1 | 9/2011 | Patel et al. |
| 2012/0011550 A1 | 1/2012 | Holland |
| 2012/0207088 A1 | 8/2012 | Liu et al. |
| 2012/0224568 A1 | 9/2012 | Freda et al. |

FOREIGN PATENT DOCUMENTS

| | | |
|---|---|---|
| WO | 2007/067176 | 6/2007 |
| WO | 2011/014992 | 2/2011 |

OTHER PUBLICATIONS

Brandenburg et al., "RTCP for Inter-Destination Media Synchronization," Internet Engineering Task Force, AVTCore, Internet Draft, Jul. 6, 2011.
European Telecommunications Standards Institute, "Telecommunications and Internet Converged Services and Protocols for Advanced Networking (TISPAN); IMS-Based IPTV Stage 3 Specification," ETSI TS 183 063 v3.5.2, Mar. 2011.
Huawei Technologies Co., Ltd et al., "Clean-up corrections to TS 26.234 (Release 8)," 3GPP TSG-SA4 Meeting #53, S4-090348 (Apr. 13, 2009).
Interdigital Communications, "Discussion on synchronization issues for Inter-UE Transfers," 3GPP TSG CT WG1 Meeting #68, C1-104775, Jacksonville (FL), USA, (Nov. 15-19, 2010).
Interdigital Communications, "IMS-based PSS and MBMS Enhancement to Support Cross-Device Synchronization," 3GPP TSG-SA4 #64, S4-110397 (Apr. 11-15, 2011).
Nokia, "Correction to media synchronization info signaling," 3GPP TSG-SA4#45, S444-070567 (Sep. 3-7, 2007).
Qualcomm, "SDP Offer/Answer Usage with Unsupported Attributes", 3GPP TSG-SA4 #44, S4-070464, (Jun. 25-29, 2007).
Schulzrinne et al., "Real Time Streaming Protocol (RTSP)," Network Working Group, Request for Comments: 2326 (Apr. 1998).
Stokking et al., "RTCP XR Block Type for inter-destination media synchronization," Audio/Video Transport Working Group, draft-brandenburg-avt-rtcp-for-imds-02.txt, Internet Draft (Oct. 11, 2010).
Third Generation Partnership Project, "Technical Specification Group Services and System Aspects; IP Mutlimedia Subsystem (IMS) Service Continuity; Stage 2 (Release 8)," 3GPP TS 23.237 V8.7.0 (Mar. 2010).
Third Generation Partnership Project, "Technical Specification Group Services and System Aspects; IP Multimedia Subsystem (IMS) Service Continuity; Stage 2 (Release 9)," 3GPP TS 23.237 V9.8.0 (Mar. 2011).
Third Generation Partnership Project, "Technical Specification Group Services and System Aspects; IP Multimedia Subsystem (IMS) Service Continuity; Stage 2 (Release 10)," 3GPP TS 23.237 V10.4.1 (Jan. 2011).
Third Generation Partnership Project, "Technical Specification Group Services and System Aspects; IP Multimedia Subsystem (IMS) Service Continuity; Stage 2 (Release 9)," 3GPP TS 23.237 V9.7.0 (Dec. 2010).
Third Generation Partnership Project, "Technical Specification Group Services and System Aspects; IP Multimedia Subsystem (IMS) Service Continuity; Stage 2 (Release 10)," 3GPP TS 23.237 V10.8.0 (Dec. 2011).
Third Generation Partnership Project, "Technical Specification Group Services and System Aspects; IP Multimedia Subsystem (IMS) Service Continuity; Stage 2 (Release 11)," 3GPP TS 23.237 V11.3.0 (Dec. 2011).
Third Generation Partnership Project, "Technical Specification Group Services and System Aspects; IP Multimedia Subsystem (IMS) Service Continuity; Inter-UE Transfer enhancements; Stage 2 (Release 10)," 3GPP TR 23.831 V10.0.0 (Sep. 2010).
Third Generation Partnership Project, "Technical Specification Group Services and System Aspects; IP Multimedia Subsystem (IMS) Service Continuity; Inter-UE Transfer enhancements; Stage 2 (Release 10)," 3GPP TR 23.831 V0.2.1 (Feb. 2010).
Third Generation Partnership Project, "Technical Specification Group Core Network and Terminals; IP Multimedia (IM) Core Network (CN) Subsystem IP Multimedia Subsystem (IMS) Service Continuity; Stage 3 (Release 8)," 3GPP TS 24.237 v8.7.0, Dec. 2010.
Third Generation Partnership Project, "Technical Specification Group Core Network and Terminals; IP Multimedia (IM) Core Network (CN) Subsystem IP Multimedia Subsystem (IMS) Service Continuity; Stage 3 (Release 8)," 3GPP TS 24.237 v8.10.0, Sep. 2011.
Third Generation Partnership Project, "Technical Specification Group Core Network and Terminals; IP Multimedia (IM) Core Network (CN) Subsystem IP Multimedia Subsystem (IMS) Service Continuity; Stage 3 (Release 9)," 3GPP TS 24.237 v9.5.0, Dec. 2010.
Third Generation Partnership Project, "Technical Specification Group Core Network and Terminals; IP Multimedia (IM) Core Network (CN) Subsystem IP Multimedia Subsystem (IMS) Service Continuity; Stage 3 (Release 9)," 3GPP TS 24.237 v9.9.0, Dec. 2011.
Third Generation Partnership Project, "Technical Specification Group Core Network and Terminals; IP Multimedia (IM) Core Network (CN) Subsystem IP Multimedia Subsystem (IMS) Service Continuity; Stage 3 (Release 10)," 3GPP TS 24.237 v10.1.0, Dec. 2010.
Third Generation Partnership Project, "Technical Specification Group Core Network and Terminals; IP Multimedia (IM) Core Network (CN) Subsystem IP Multimedia Subsystem (IMS) Service Continuity; Stage 3 (Release 10)," 3GPP TS 24.237 v10.5.0, Dec. 2011.

(56) References Cited

OTHER PUBLICATIONS

Third Generation Partnership Project, "Technical Specification Group Core Network and Terminals; IP Multimedia (IM) Core Network (CN) Subsystem IP Multimedia Subsystem (IMS) Service Continuity; Stage 3 (Release 11)," 3GPP TS 24.237 v11.1.0, Dec. 2011.
Third Generation Partnership Project, "Technical Specification Group Services and System Aspects; IP Multimedia (IMS); Multimedia Telephony; Media Handling and Interaction (Release 7)," 3GPP TS 26.114 v7.13.0, Dec. 2010.
Third Generation Partnership Project, "Technical Specification Group Services and System Aspects; IP Multimedia Subsystem (IMS); Multimedia Telephony; Media Handling and Interaction (Release 7)," 3GPP TS 26.114 v7.15.0, Dec. 2011.
Third Generation Partnership Project, "Technical Specification Group Services and System Aspects; IP Multimedia Subsystem (IMS); Multimedia Telephony; Media Handling and Interaction (Release 8)," 3GPP TS 26.114 v8.7.0, Dec. 2010.
Third Generation Partnership Project, "Technical Specification Group Services and System Aspects; IP Multimedia Subsystem (IMS); Multimedia Telephony; Media Handling and Interaction (Release 8)," 3GPP TS 26.114 v8.9.0, Dec. 2011.
Third Generation Partnership Project, "Technical Specification Group Services and System Aspects; IP Multimedia Subsystem (IMS); Multimedia Telephony; Media Handling and Interaction (Release 9)," 3GPP TS 26.114 v9.4.0, Dec. 2010.
Third Generation Partnership Project, "Technical Specification Group Services and System Aspects; IP Multimedia Subsystem (IMS); Multimedia Telephony; Media Handling and Interaction (Release 9)," 3GPP TS 26.114 v9.7.0, Dec. 2011.
Third Generation Partnership Project, "Technical Specification Group Services and System Aspects; IP Multimedia Subsystem (IMS); Multimedia Telephony; Media Handling and Interaction (Release 10)," 3GPP TS 26.114 v10.2.0, Dec. 2011.
Third Generation Partnership Project, "Technical Specification Group Services and System Aspects; IP Multimedia Subsystem (IMS); Multimedia Telephony; Media Handling and Interaction (Release 11)," 3GPP TS 26.114 v11.2.0, Dec. 2011.
Third Generation Partnership Project, "Technical Specification Group Services and System Aspects; Transparent End-to-End Packet-Switched Streaming Service (PSS); Protocols and Codecs (Release 9)," 3GPP TS 26.234 v9.5.0, Dec. 2010.
Third Generation Partnership Project, "Technical Specification Group Services and System Aspects; Transparent End-to-End Packet-Switched Streaming Service (PSS); Protocols and Codecs (Release 9)," 3GPP TS 26.234 v9.7.0, Dec. 2011.
Third Generation Partnership Project, "Technical Specification Group Services and System Aspects; Transparent End-to-End Packet-Switched Streaming Service (PSS); Protocols and Codecs (Release 10)," 3GPP TS 26.234 v10.3.0, Dec. 2011.
Third Generation Partnership Project, "Technical Specification Group Services and System Aspects; Transparent End-to-End Packet-Switched Streaming Service (PSS); Progressive Download and Dynamic Adaptive Streaming Over HTTP (3GP-DASH) (Release 10)," 3GPP TS 26.247 v1.1.0, Jan. 2011.
Third Generation Partnership Project, "Technical Specification Group Services and System Aspects; Transparent End-to-End Packet-Switched Streaming Service (PSS); Progressive Download and Dynamic Adaptive Streaming Over HTTP (3GP-DASH) (Release 10)," 3GPP TS 26.247 v10.1.0, Dec. 2011.
Third Generation Partnership Project, "Technical Specification Group Services and System Aspects; IP Multimedia Subsystem (IMS) Based Packet Switch Streaming (PSS) and Multimedia Broadcast/Multicast Service (MBMS) User Service; Protocols (Release 8)," 3GPP TS 26.237 v8.5.0, Oct. 2010.
Third Generation Partnership Project, "Technical Specification Group Services and System Aspects; IP Multimedia Subsystem (IMS) Based Packet Switch Streaming (PSS) and Multimedia Broadcast/Multicast Service (MBMS) User Service; Protocols (Release 8)," 3GPP TS 26.237 v8.7.0, Dec. 2011.
Third Generation Partnership Project, "Technical Specification Group Services and System Aspects; IP Multimedia Subsystem (IMS) Based Packet Switch Streaming (PSS) and Multimedia Broadcast/Multicast Service (MBMS) User Service; Protocols (Release 9)," 3GPP TS 26.237 v9.4.0, Oct. 2010.
Third Generation Partnership Project, "Technical Specification Group Services and System Aspects; IP Multimedia Subsystem (IMS) Based Packet Switch Streaming (PSS) and Multimedia Broadcast/Multicast Service (MBMS) User Service; Protocols (Release 9)," 3GPP TS 26.237 v9.8.0, Dec. 2011.
Third Generation Partnership Project, "Technical Specification Group Services and System Aspects; IP Multimedia Subsystem (IMS) Based Packet Switch Streaming (PSS) and Multimedia Broadcast/Multicast Service (MBMS) User Service; Protocols (Release 10)," 3GPP TS 26.237 v10.0.0, Oct. 2010.
Third Generation Partnership Project, "Technical Specification Group Services and System Aspects; IP Multimedia Subsystem (IMS) Based Packet Switch Streaming (PSS) and Multimedia Broadcast/Multicast Service (MBMS) User Service; Protocols (Release 10)," 3GPP TS 26.237 v10.4.0, Dec. 2011.
Third Generation Partnership Project, "Technical Specification Group Services and System Aspects; Transparent end-to-end Packet-switched Streaming Service (PSS); Protocols and codecs (Release 4)," 3GPP TS 26.234 V4.5.0 (Dec. 2002).
Third Generation Partnership Project, "Technical Specification Group Services and System Aspects; Transparent end-to-end Packet-switched Streaming Service (PSS); Protocols and codecs (Release 5)," 3GPP TS 26.234 V5.7.0 (Mar. 2005).
Third Generation Partnership Project, "Technical Specification Group Services and System Aspects; Transparent end-to-end Packet-switched Streaming Service (PSS); Protocols and codecs (Release 6)," 3GPP TS 26.234 V6.14.0 (Mar. 2009).
Third Generation Partnership Project, "Technical Specification Group Services and System Aspects; Transparent end-to-end Packet-switched Streaming Service (PSS); Protocols and codecs (Release 8)," 3GPP TS 26.234 V8.4.0 (Sep. 2009).
Third Generation Partnership Project, "Technical Specification Group Services and System Aspects; Transparent end-to-end Packet-switched Streaming Service (PSS); Protocols and codecs (Release 7)," 3GPP TS 26.234 V7.9.0 (Sep. 2009).

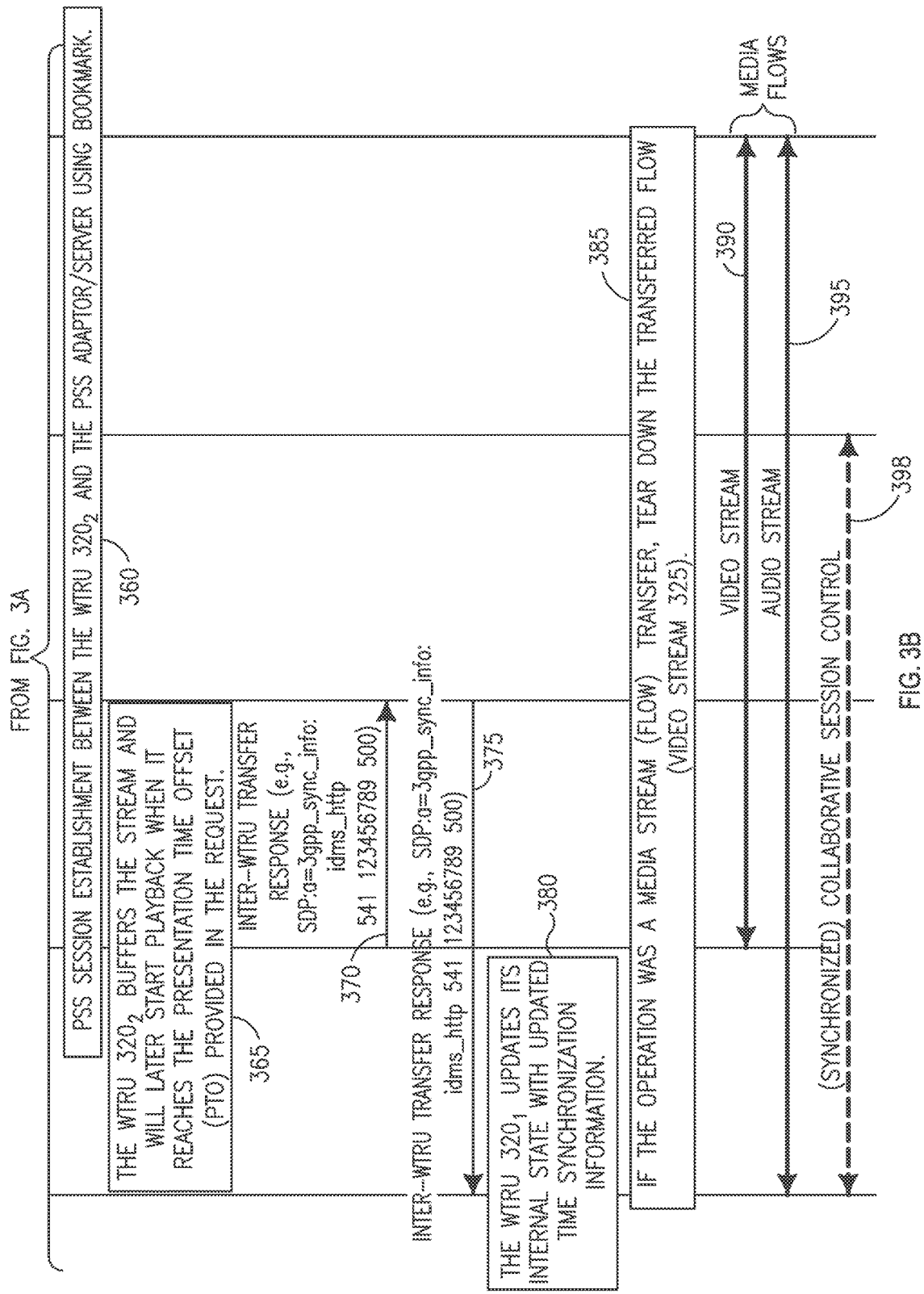

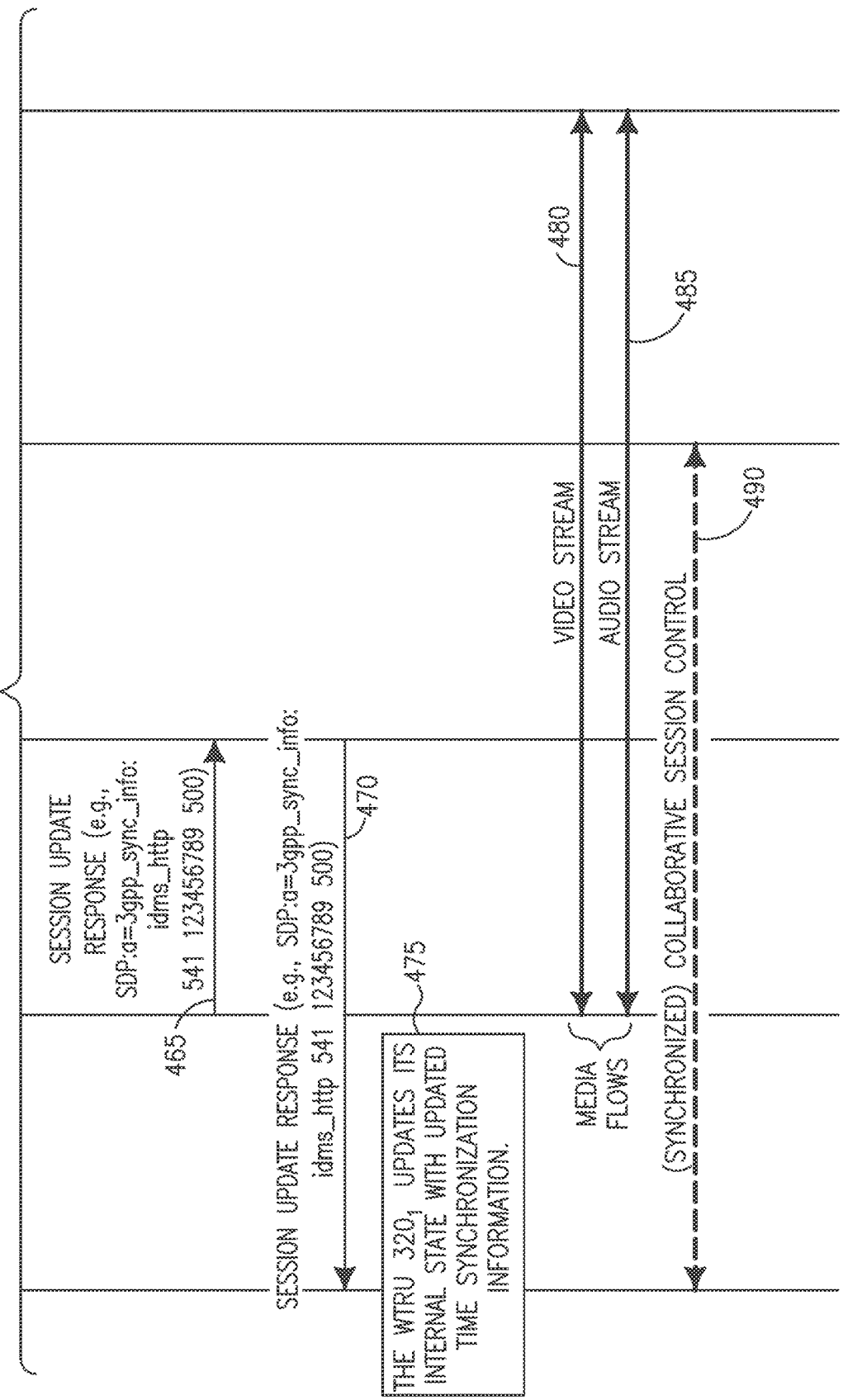

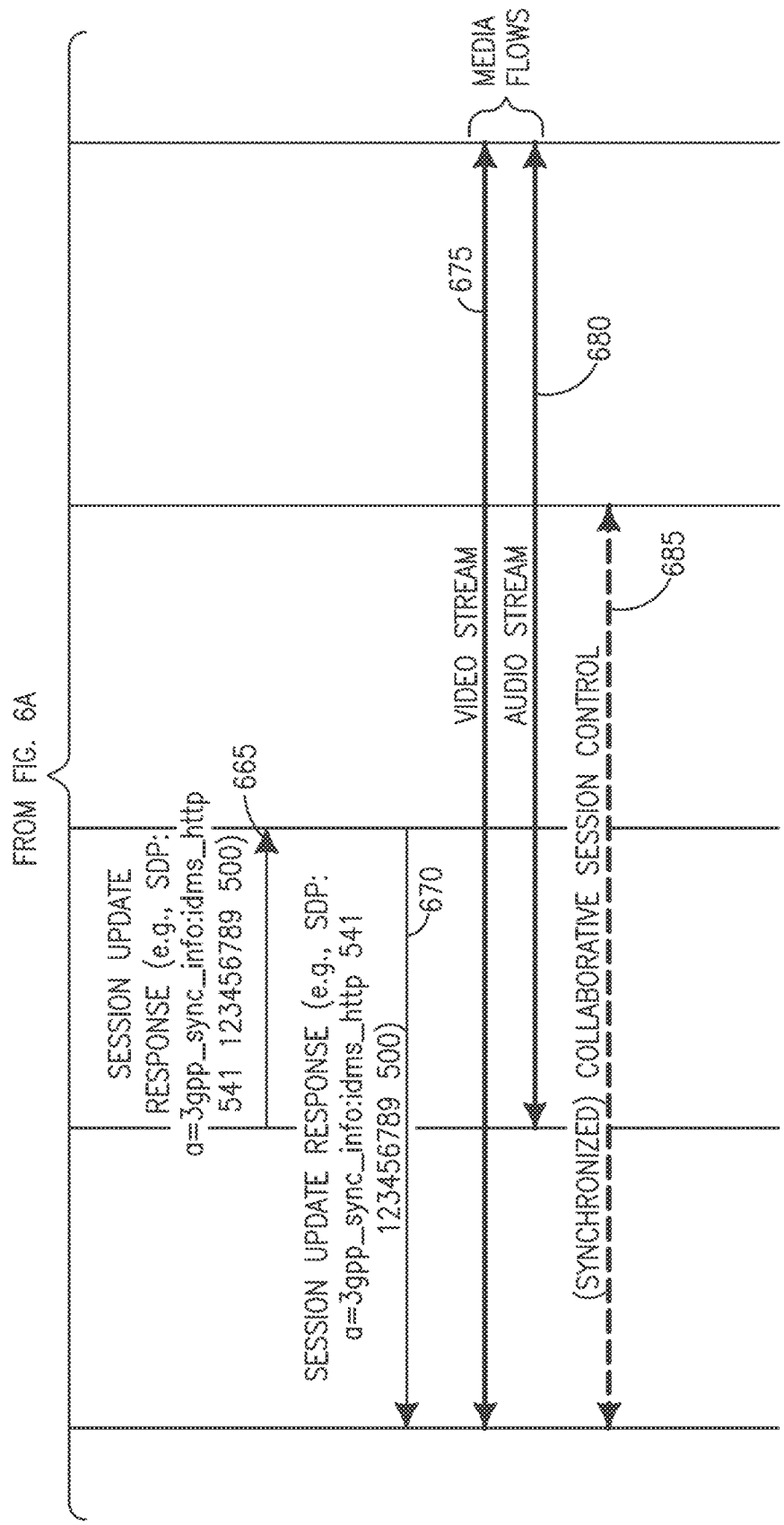

METHOD AND APPARATUS FOR SYNCHRONIZING MOBILE STATION MEDIA FLOWS DURING A COLLABORATIVE SESSION

CROSS REFERENCE TO RELATED APPLICATIONS

This application is a continuation of U.S. patent application Ser. No. 14/691,121, filed Apr. 20, 2015, which is a continuation of U.S. patent application Ser. No. 13/370,028, filed Feb. 9, 2012, which issued as U.S. Pat. No. 9,014,170 on Apr. 21, 2015, which claims the benefit of U.S. Provisional Application No. 61/442,008 filed Feb. 11, 2011, which are hereby incorporated by reference as if fully set forth.

BACKGROUND

An Internet protocol (IP) multimedia subsystem (IMS) may be configured to deliver multimedia services using collaborative sessions. A collaborative session may include a set of two or more access legs and related media on two or more wireless transmit/receive units (WTRUs) having IMS subscriptions that are presented as one remote leg. One of the WTRUs may be designated as a controller of a collaborative session, and may initiate inter-WTRU transfer of media flows within the IMS that target other WTRUs of the collaborative session.

Packet switched streaming (PSS) technology may be integrated inside the IMS using real-time transport protocol (RTP), progressive hypertext transfer protocol (HTTP) and adaptive HTTP streaming. The PSS technology may provide platforms to deliver, for example, content on demand or a live television (TV) show.

SUMMARY

A method and apparatus are described for synchronizing mobile station (i.e., wireless transmit/receive unit (WTRU)) media flows during a collaboration session. Inter-WTRU transfer request messages, flow addition request messages and session update request messages may be exchanged between a plurality of WTRUs and a session continuity control application server (SCC-AS). Each of the messages may include a session description protocol (SDP) attribute line containing time synchronization information (e.g., a presentation time offset (PTO) information element (IE), a media flow group identity (ID) and a synchronization tolerance IE). The SCC-AS may update the time synchronization information and include the updated information in messages it sends to the WTRUs, which may re-synchronize their respective media flows based on the updated time synchronization information.

In one embodiment, a first one of the WTRUs may transmit a first message including original time synchronization information and a request to perform an operation on the media flows. A second one of the WTRUs may receive a second message including the request to perform the operation on the media flows and either the original time synchronization information or updated time synchronization information. The second WTRU may re-synchronize its media flow based on one of the original time synchronization information, the updated time synchronization information, or further updated time synchronization information. The second WTRU may transmit a third message including the time synchronization information used to re-synchronize its media flow. The first WTRU may receive a fourth message including the time synchronization information used to re-synchronize the second WTRU's media flow. The first WTRU may update its internal state with the time synchronization information used to re-synchronize the second WTRU's media flow.

In another embodiment, a first one of the WTRUs may transmit a first message requesting an update to a collaborative session. A second one of the WTRUs may receive a second message including a media flow group identity (ID) information element (IE) and a synchronization tolerance IE. The second one of the WTRUs may synchronize the media flows, perform presentation time offset (PTO) measurements on each of the media flows and generate a combined media flow PTO IE based on the PTO measurements.

BRIEF DESCRIPTION OF THE DRAWINGS

A more detailed understanding may be had from the following description, given by way of example in conjunction with the accompanying drawings wherein:

FIGS. 3A and 3B, taken together, show an example communication exchange for moving a flow and creating a synchronized collaborative session;

FIGS. 4A and 4B, taken together, show an example communication exchange for upgrading a non-synchronized collaborative session to a synchronized collaborative session;

FIGS. 6A and 6B, taken together, show an example communication exchange for correcting a lack of synchronization;

DETAILED DESCRIPTION

Figure 1A:
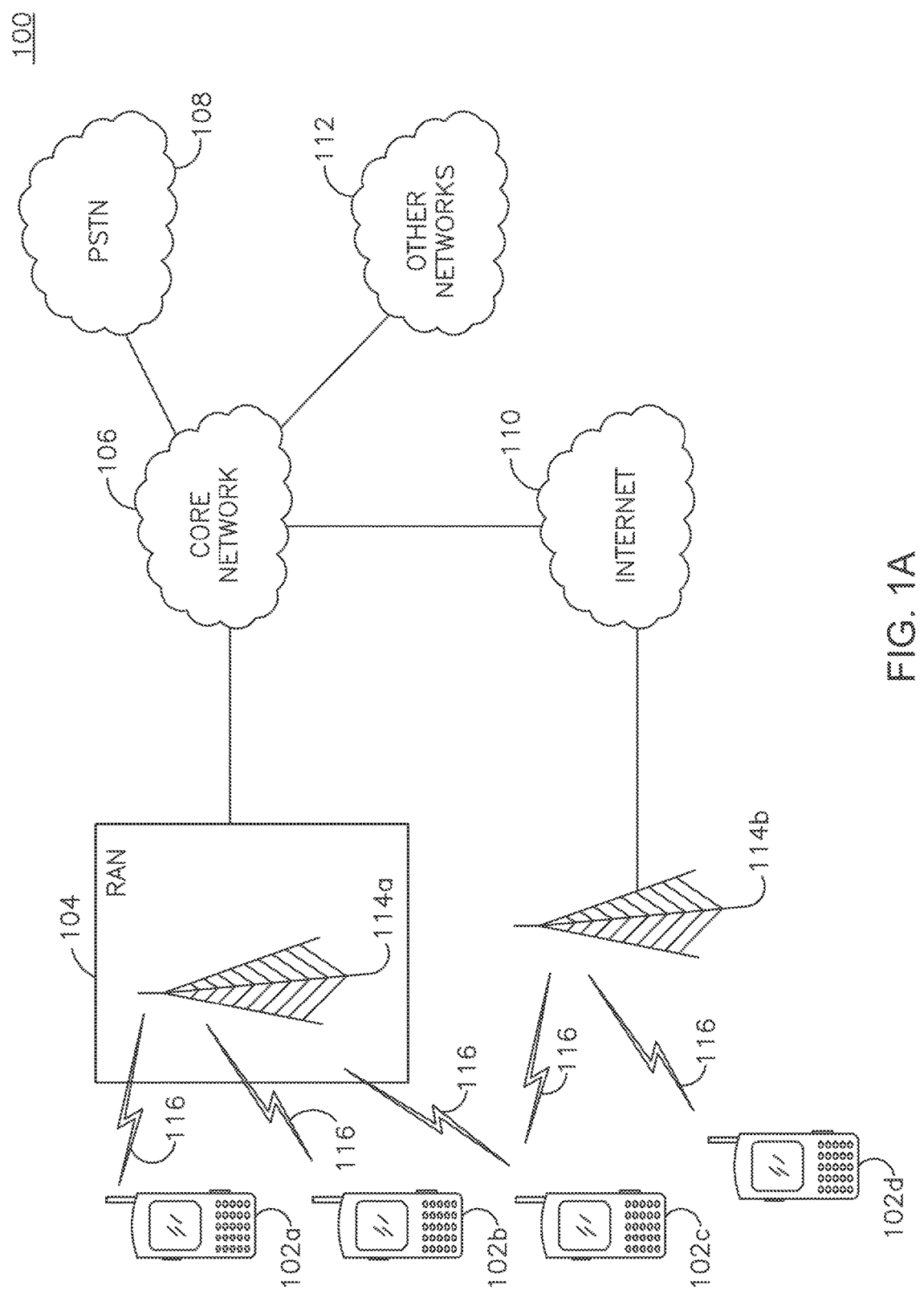
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1x, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
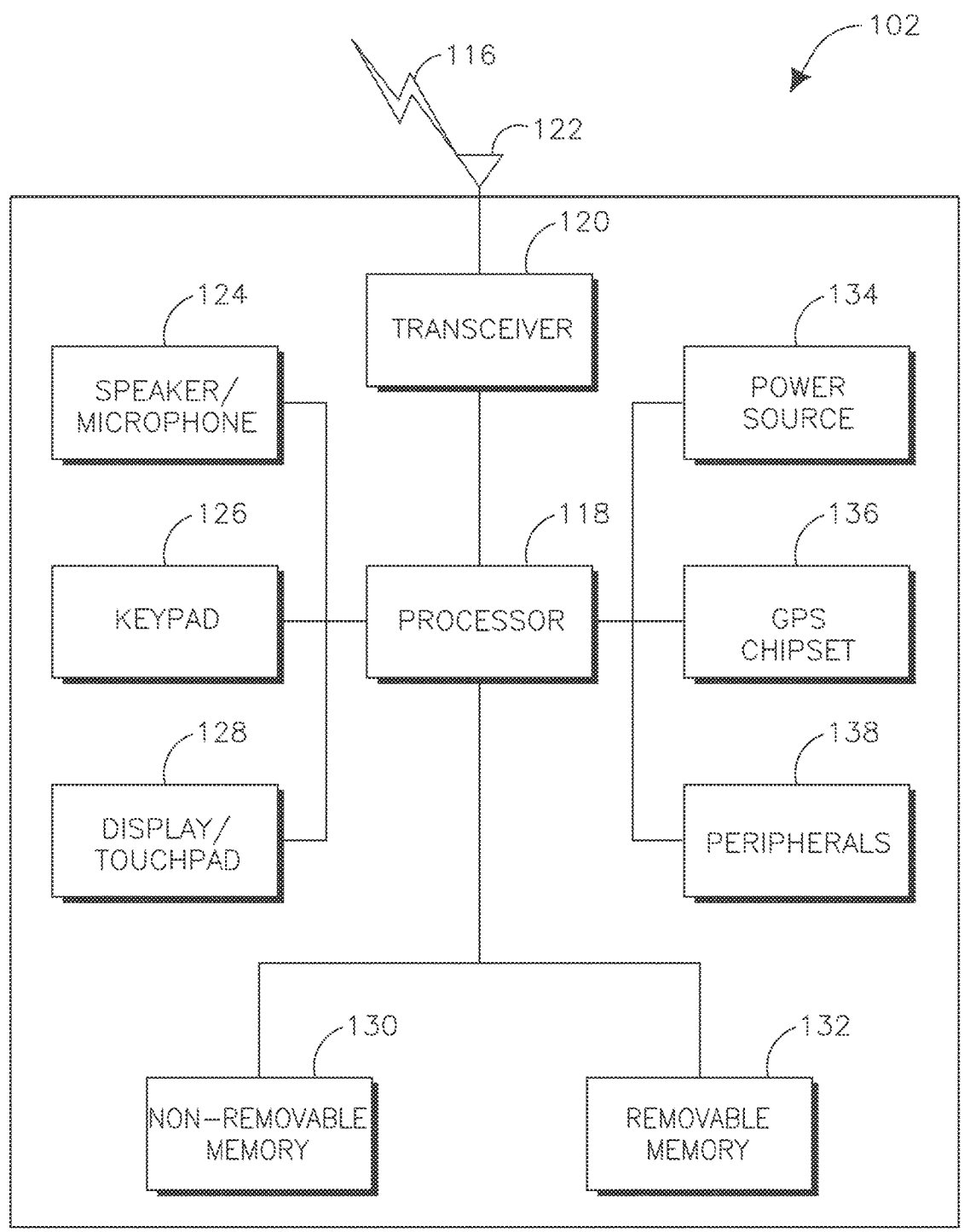
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
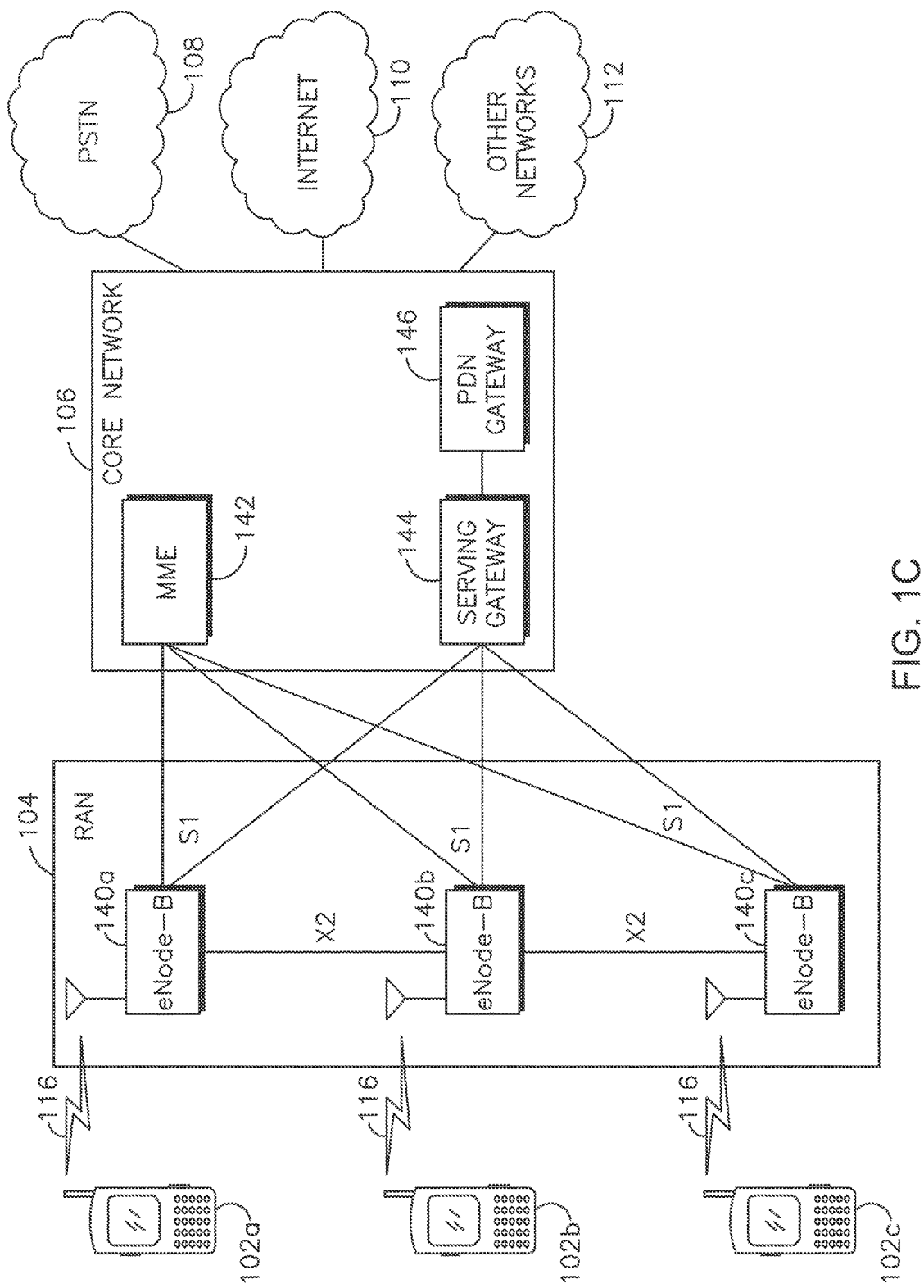
FIG. 1C shows an example radio access network and an example core network that may be used within the communications system shown in FIG. 1A.

FIG. 1C shows an example RAN 104 and an example core network 106 that may be used within the communications system 100 shown in FIG. 1A. As noted above, the RAN 104 may employ an E-UTRA radio technology to communicate with the WTRUs 102a, 102b, 102c over the air interface 116. The RAN 104 may also be in communication with the core network 106.

The RAN 104 may include eNBs 140a, 140b, 140c, though it will be appreciated that the RAN 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the uplink and/or downlink, and the like. As shown in FIG. 1C, the eNBs 140a, 140b, 140c may communicate with one another over an X2 interface.

The core network 106 shown in FIG. 1C may include a mobility management entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNBs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway, (e.g., an IP multimedia subsystem (IMS) server), that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
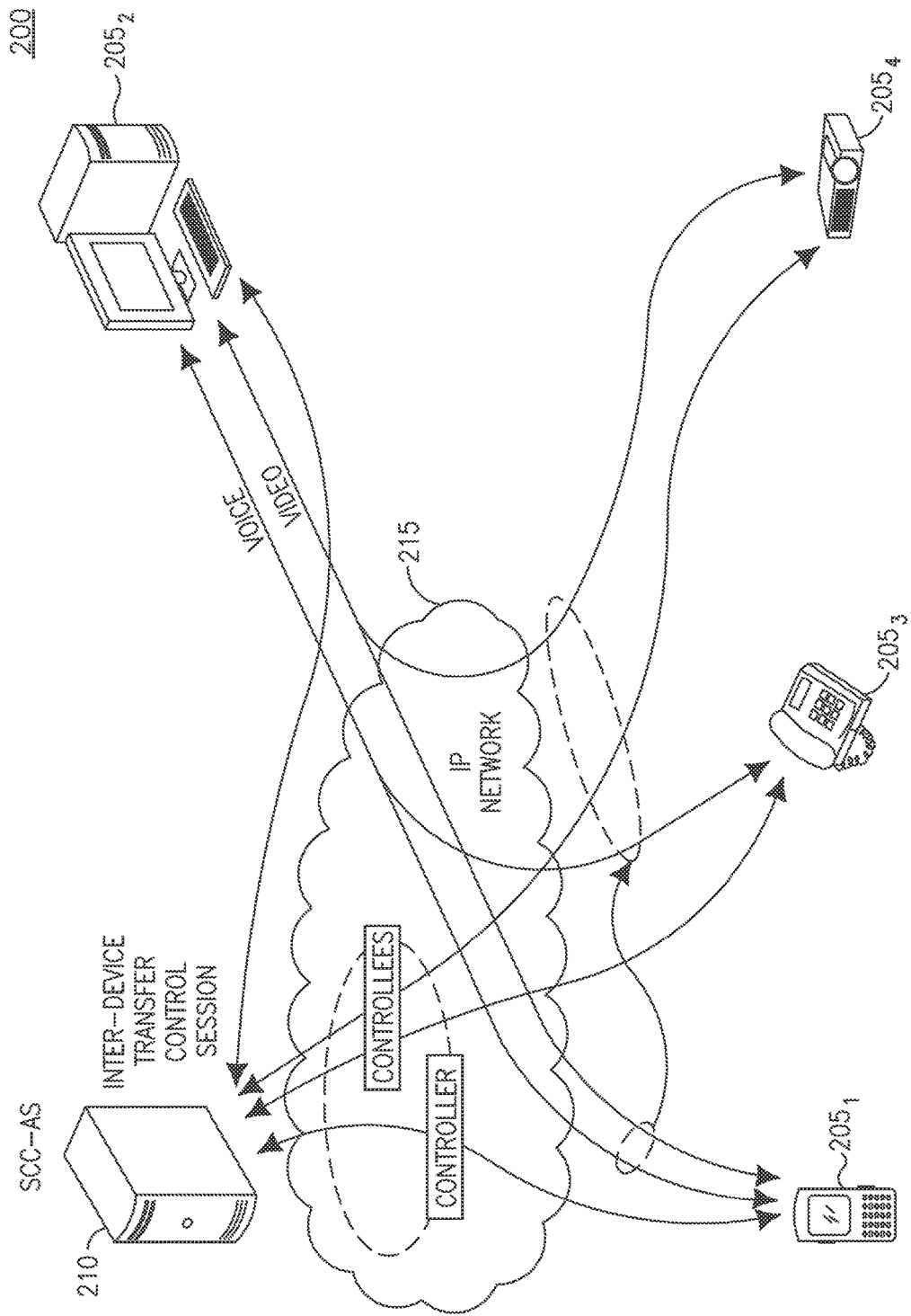
FIG. 2 shows an example communication exchange for an inter-WTRU transfer of a PSS session.

FIG. 2 shows an inter-WTRU transfer operation taking place in a system 200 by creating a collaborative session. The system 200 may include a plurality of WTRUs $205_1$, $205_2$, $205_3$ and $205_4$, a session continuity control application server (SCC-AS) 210 and an IP network 215. The system 200 may provide multimedia services using collaborative sessions. As shown in FIG. 2, voice and video flows between WTRUs $105_1$ and $105_2$ may be moved to WTRUs $105_3$ and $105_4$. A collaborative session may include a set of two or more access legs and related media on two or more WTRUs having IMS subscriptions that are presented as one remote leg. One of the WTRUs may be designated as a controller of a collaborative session, and may initiate inter-WTRU transfer of media flows within the system 200 that target other WTRUs of the collaborative session. A session transfer procedure may be implemented in the system 200 to transfer the session control and/or media flows related to the session.

WTRUs may exchange information elements (IEs) to enable inter-device media synchronization. These IEs may include a group identity (ID) IE, (which may enable matching synchronized flows together), a presentation time offset (PTO) IE, and a synchronization tolerance IE.

The group ID IE may identify flows that are being synchronized together. An empty group ID, (e.g., designated as having a placeholder value of 0, or the presence of a flag), may be present in a request to indicate that the network may generate and/or assign a group ID. After the group is created in response to the request, time synchronization information may include a valid group ID.

A PTO IE may be used to ensure that synchronized playback occurs for a plurality of WTRUs. A PTO may calculated as follows:

$$PTO = Current\_playback\_time - Current\_timestamp, \quad \text{Equation (1)}$$

where the Current_playback_time may be based on a wall clock time when performing the playback of a first byte of a current segment being played, and the Current_timestamp may be a timestamp of the segment, relative to the beginning of the media presentation. A PTO calculation may be performed at an interval, and/or at all media segments. Also, the PTO calculation may be performed at random access points (RAPs).

The synchronization tolerance IE may be optionally provided to a plurality of WTRUs to enable triggering corrective actions when a flow goes out of sync.

Timing synchronization between PSS flows terminated by different WTRUs within an IMS collaborative session may also include the use of session description protocol (SDP) attributes to attach the IEs described above with media sessions or flows. The SDP attributes may be included, for example, in any or any combination of messages used for inter-WTRU transfer.

The SDP attributes may extend support synchronization between the flows of two different collaborative sessions controlled by the same device. For example, SDP attributes may be used to synchronize related flows streamed from different servers.

The media session description may contain time synchronization information. This information may be set to regular values and sent to a device. The media player on this device may use the information to adjust its playback timing. This information may be set to a placeholder value, for example zero. The recipient may replace the placeholder with an actual value, for example, the PTO obtained from the media player.

A collaborative session may be created as synchronized as described below, or may be updated to become synchronized after its creation.

IMS signaling may be used to set up the playback timing on WTRUs using a PTO. When this offset is known and used by WTRUs, the WTRUs may be playing the segment with the time stamp $TS_0$ at a given wall clock time $T_0 = TS_0 + PTO$. During the playing, it may be the responsibility of the WTRUs to maintain a buffer large enough to maintain this offset across varying network access conditions. One possible condition in maintaining offset may require all WTRUs use the same wall clock time. Therefore, time synchronization may be based on network time protocol (NTP).

Processing may be performed in the client of the WTRU to measure PTO on a stream, set the desired PTO on a stream, and produce an event when the measurement may be out of the defined tolerance. For example, if a WTRU goes out of sync, the actual time stamp played at $T_0$ is $TS_1$ When synchronized, $T_0$ is $TS_0$, therefore the absolute difference may be calculated and compared to the synchronization tolerance, (diff=ABS ($T_0$–PTO–$TS_1$)). The result may used to determine if the time difference is greater than the synchronization tolerance. The WTRU may use an update procedure to indicate the problem. When applicable, (e.g., when a WTRU may not keep up with the playback timing), the SCC-AS may decide to use the lagged PTO, and send it to the WTRUs to be synchronized. Alternatively, the SCC-AS may decide to reset the original PTO to the lagging WTRU. Therefore, the SCC-AS may maintain and distribute the inter-device media synchronization information.

Examples of synchronization types are the single shot and continuous synchronization. Single shot synchronization may occur when the PTO is initially determined and may be used to provide PTO for any new flows. The mechanism to update the PTO later on may be possible. Synchronization information may be carried over IMS signaling, although the possibility exists to send the synchronization information along with data.

Media flow synchronization for RTP flows may be enabled using the RTP control protocol (RTCP). Inter-destination media synchronization (IDMS) develops RTCP extensions to support inter-device media flow synchronization. This RTCP-based mechanism may provide timing information periodically during the whole streaming sessions. This may enable continuous adjustment of playback. This continuous adjustment may be especially useful since one of the goals may be to support bi-directional (e.g., voice over IP (VoIP)) conversations. In this case, it may be important to minimize the buffering, which in turn may cause the flows to be more sensitive to sudden network slow-downs or losses.

PSS streaming may be used to support the playback of content on demand or live unidirectional content. There may be less need to minimize buffering in these types of applications, based on the buffering capacity of the WTRU. Therefore, varying buffer sizes may be used on specific applications. For example, while the maximum delay acceptable for conversational voice may be on the order of magnitude of hundreds of ms, buffering of a few seconds may be seen as acceptable for content on demand streaming during the buffering at startup.

Since a larger buffer may be used to play PSS streaming content, a one-time synchronization at the beginning of playback may be sufficient, and the buffer may compensate for most network jitter. Corrective actions may be triggered when a device detects that it is out of sync, but there may be limited amount of times to periodically re-synchronize the flow. A single shot scheme may reduce the amount of signaling related to time synchronization.

Examples of signaling types are in-band and out-of band. In the RTP streaming case, RTCP packets may be sent by the devices to the sender. Since RTCP packets typically follow the same network path as the RTP flows, this may be referred as in-band signaling. Also, in the RTP streaming case, the sender has an active part in the synchronization process. Since progressive HTTP and adaptive HTTP streaming may be using stock HTTP servers, out-of-band signaling path to synchronize the HTTP streams may be preferred.

PSS streaming may include both HTTP and RTP streaming. The embodiments below may apply to any streaming protocol supported PSS, and may allow synchronization between flows using different protocols.

Figure 3A:
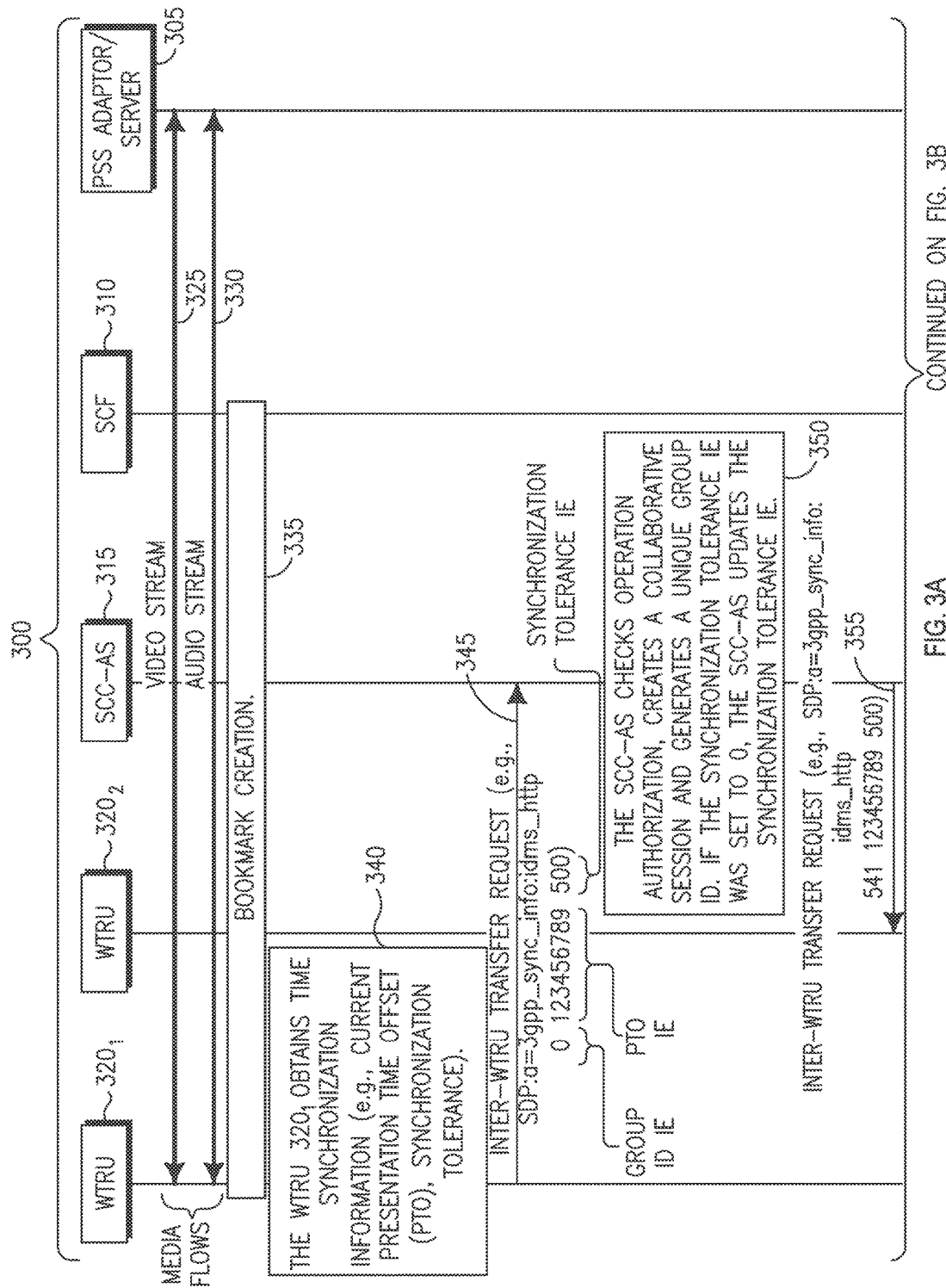

FIGS. 3A and 3B, taken together, show an example communication exchange for moving a flow and creating a synchronized collaborative session during an inter-WTRU transfer operation in a wireless communication system 300 including a packet switched streaming (PSS) adaptor/server 305, a session control function (SCF) 310, an session continuity control application server (SCC-AS) 315 and WTRUs $320_1$ and $320_2$. Each of the WTRUs $320_1$ and $320_2$ may include a client or application used during a communication session.

As shown in FIG. 3A, a video stream 325 and an audio stream 330, (i.e., media flows), are established between the WTRU $320_1$ and the PSS adapter/server 305, and a bookmark is created (335). The WTRU $320_1$ may obtain time synchronization information, (e.g., the current PTO of all flows in the collaborative session, synchronization tolerance), before an inter-WTRU transfer is performed (340). The synchronization tolerance may be pre-configured, or set based on the nature of the flow or type of the source and target WTRUs. The time synchronization information may also be set to a placeholder, (e.g., the value 0), by the WTRU $320_1$, or the SCC-AS 315 may provide it.

As shown in FIG. 3A, the WTRU $320_1$ may transmit an inter-WTRU transfer request message 345 to the SCC-AS 315 that includes an SDP attribute line (i.e., an "a" line) containing a group ID IE, a PTO IE and a synchronization tolerance IE, in the following format:

a=3gpp_sync_info:idms_http <group_ID> <PTO> <synchronization_tolerance>.

In the example shown in FIG. 3A, the SDP attribute line in the message 345 may indicate that inter-WTRU synchronization is requested, and additionally may provide the IEs for reaching this synchronization. The SDP attribute line may be utilized to encode inter-WTRU media synchronization information elements, and may be present in all media sections describing media synchronized within the collaborative session.

As shown in the example of FIG. 3A, the group ID is set to a placeholder value (0) until a new group is created by the SCC-AS 315, the PTO is set to "123456789", and the synchronization tolerance is set to "500" ms. The SCC-AS 315 may then check the operation authorization, create a collaborative session, and update the time synchronization IEs as needed, (e.g., generates a unique group ID if it was not provided by the WTRU, and update the time synchronization tolerance IE if it was set to a placeholder ("0")), (350). The SCC-AS 315 may then send an inter-WTRU transfer request message 355 including the updated time synchronization information to the WTRU $320_2$, (i.e., the target WTRU). Alternatively, the inter-WTRU transfer request message 355 may include the same original time synchronization information that was included in the inter-WTRU transfer request message 345.

Referring to FIG. 3B, a PSS session is established between the target WTRU $320_2$ and the PSS adaptor/server 305 using a bookmark (360) after the WTRU accepts the inter-WTRU transfer request message 355 and establishes the transferred session. In 365, the WTRU $320_2$ may alter its streaming software client behavior to take into account the PTO in the transfer request message 355. In particular, the presentation (display) of the stream to the user may be properly delayed in order to match the PTO IE in the inter-WTRU transfer request 355. The WTRU $320_2$ may send an inter-WTRU transfer response message 370 including the same time synchronization IEs to the SCC-AS 315 that were included in the inter-WTRU transfer request message 355. Alternatively, for example, if it was not possible to apply the PTO in WTRU $320_2$ because of a limitation of client software or a need for a larger buffer, the response message 370 may contain further updated time synchronization information including a different PTO IE value than that included in either of the messages 345 or 355. The SCC-AS 315 may then send an inter-WTRU transfer response message 375 including the original time synchronization information, the updated time synchronization information, or the further updated synchronization information to the WTRU $320_1$. The WTRU $320_1$ may update its internal state, (i.e., a data structure representing the state of the collaborative session including IDs of the WTRUs 320), with updated time synchronization information (380). In 385, the transferred flow (video stream 325) between the WTRU $320_1$ and the PSS adaptor/server 305 may be teared down, if the operation was a media stream (i.e., flow) transfer, (e.g., if the operation was a flow replication instead, this step would be skipped). A video stream 390 may then be established between the WTRU $320_2$ and the PSS adapter/server 305, and an audio stream 395 may be established between the WTRU $320_1$ and the PSS adapter/server 305. A synchronized collaborative session 398 may thus be controlled by the WTRU $320_1$ through the SCF 310 during the inter-WTRU transfer procedure, whereby the WTRU $320_1$ serves as a controller of the collaborative session 398. The collaborative session 398 may be assigned a new "synchronized" attribute to indicate that all of its media flows are synchronized across all of the WTRUs 320.

For example, in the communication exchange shown in FIGS. 3A and 3B, the PTO may be obtained by the $WTRU_1$ measuring the value on the ongoing playback on this client. Group ID, originally unknown by the client, may be set to an "unknown" value, (arbitrarily chosen as 0 in this example). Sync tolerance may be set to a value from configuration, or to an "unknown" value (e.g., 0) and, in this case, may be determined by the SCC-AS 315.

The group ID may be set once by the SCC-AS 315, and may be used to determine which streams may be synchronized together. There may be a unique single group ID per collaborative session. However, in some cases, two collaborative sessions may be synchronized together by sharing one group ID. The SCC-AS 315 may collect the PTO from an initial measurement by a client, and then may set this value for all flows of this group ID. The SCC-AS 315 may receive a PTO adjustment from an out-of-sync client later on.

Upon reception by a client, the PTO may be provided to the client media player application and used by the application to decide which media segment may be displayed at a given time. If the playback buffer becomes empty, (e.g., due to a temporary network shortage), the client application playback may start lagging. The client may indicate its new PTO to the SCC-AS 315, (e.g., when starting playback again after the temporary network shortage ends). The SCC-AS 315 may then initiate re-synchronization, either by updating all WTRUs to use the new PTO, or by requesting the lagging WTRU to use the original PTO again.

Time synchronization may be applied in a similar manner if the inter-WTRU operation is flow creation, (i.e., flow addition), rather than a flow transfer. The resulting procedure may be similar to the procedure shown in FIGS. 3A and 3B, except that step 385 would not be included.

Figure 4A:
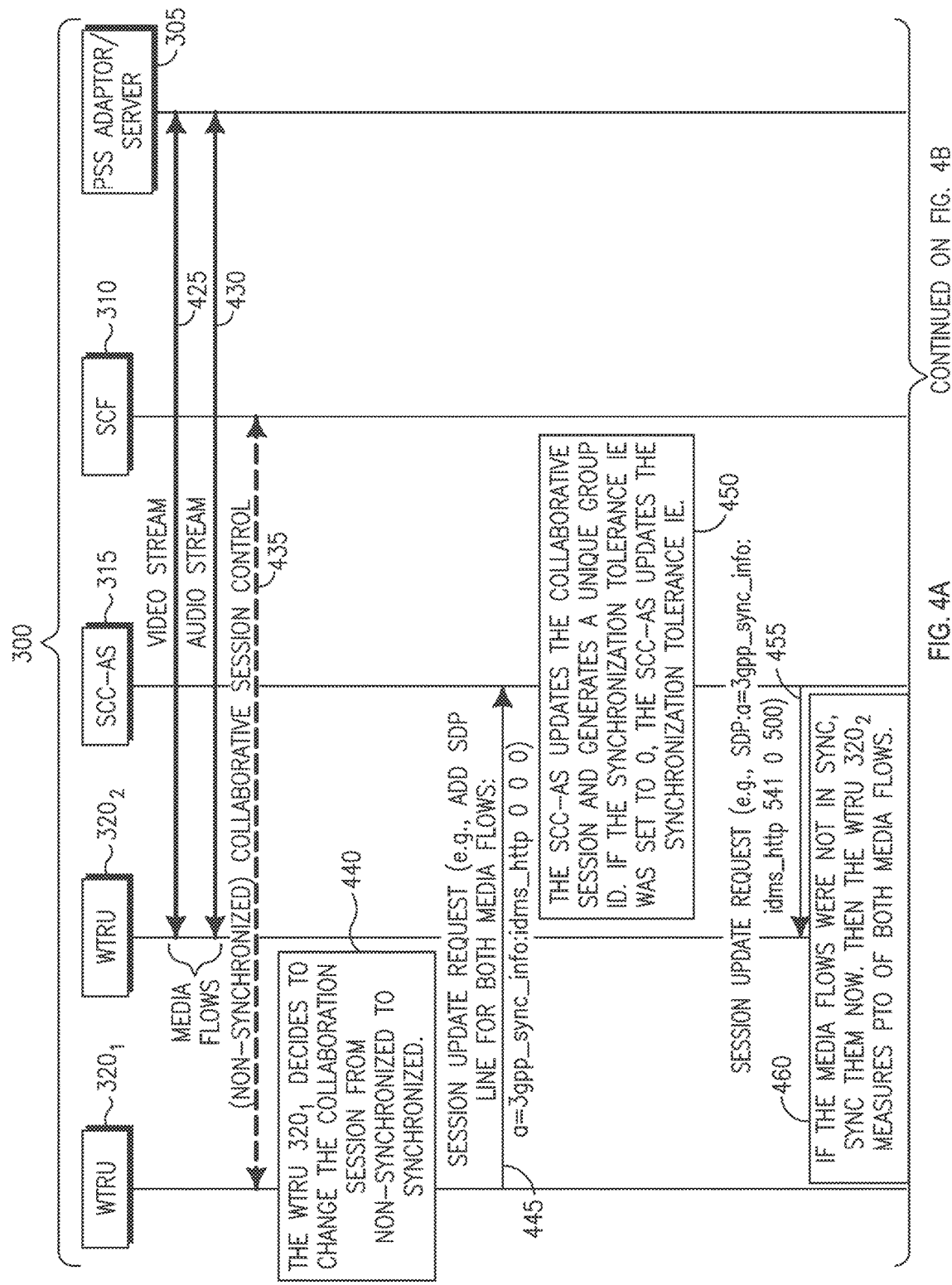

FIGS. 4A and 4B, taken together, show an example communication exchange for upgrading a non-synchronized collaborative session to a synchronized collaborative session.

As shown in FIG. 4A, a video stream 425 and an audio stream 430, (i.e., media flows), are established between the WTRU $320_2$ and the PSS adapter/server 305, but the WTRU $320_1$ retained control of a collaborative session 435 through the SCF 310 that was created during a previous inter-WTRU transfer where video and audio streams were transferred from the WTRU $320_1$ to the WTRU $320_2$. The earlier collaborative sessions may not have specified any synchronization, and thus the flows may not be well synchronized. As shown in FIG. 4A, the flows (streams 425 and 430) are both terminated by the WTRU $320_2$, and thus are typically well synchronized because video/audio synchronization is typically well handled by streaming client software on a single WTRU. Nevertheless, the WTRU $320_1$ may want to transform the non-synchronized collaborative session 435 into a synchronized collaborative session in preparation for a future operation, (e.g., the audio stream 425 and the video stream 430 may later be duplicated on another WTRU). In 440, the WTRU $320_1$ may decide to synchronize the flows of the collaborative session with each other (i.e., change the collaboration session from non-synchronized to synchronized). The WTRU $320_1$ may send a session update request message 445 including time synchronization IEs using a dedicated new SDP line attribute, which may be present inside each media-level description section of the SDP payload, (as shown in FIG. 4A), or alternatively may be present solely in a session-level description section, to indicate that it applies to every media flow in the collaborative session. In the example shown in FIG. 4A, the WTRU $320_1$ may use a placeholder value 0 for the group ID, PTO and synchronization tolerance IEs, because these values are unknown to the WTRU $320_1$ and may later be updated by the SCC-AS 315 or the WTRU $320_2$. The SCC-AS 315 may then update the collaborative session, and update the time synchronization IEs as needed, (e.g., generates a unique group ID if it was not provided by the WTRU, and update the synchronization tolerance IE if it was set to a placeholder ("0")), (450). The SCC-AS 315 may then send a session update request message 455 to the WTRU $320_2$. The WTRU $320_2$ may proceed with synchronizing the media flows, (e.g., by delaying the presentation of one media flow to match the presentation of the other media flow), and then measuring the PTO of both media flows, (which should be identical or very close to each other since they are used by a single WTRU in this example), (460). The PTO of the combined media flows may be generated from these measurements, (e.g., mean value, or largest value).

Referring to FIG. 4B, the WTRU $320_2$ may send a session update response message 465 including a combined media flow PTO IE to the SCC-AS 315. The SCC-AS 315 may then send a session update response message 470 to the WTRU $320_1$, which may update its internal state, (i.e., a representation of the collaborative session), with updated time synchronization information. A video stream 480 and an audio stream 485 may be synchronized. A collaborative session 490 may thus be controlled by the WTRU $320_1$ through the SCF 310, whereby the WTRU $320_1$ may serve as a controller of the synchronized collaborative session 490. The collaborative session 490 may be assigned a new "synchronized" attribute to indicate that all of its media flows are synchronized across all of the WTRUs 320.

A controller WTRU may control a collaborative session and have a service profile that determines the services on a remote leg. The controller WTRU may also support media flows for a collaborative session and may request inter-device transfer media control related procedures.

A controllee WTRU may support media flows for a collaborative session and may request inter-device transfer media control-related procedures but is subordinate to a controller WTRU for authorization of these procedures.

For example, a collaborative session may transfer or duplicate a synchronized flow on another device. Thus, the controller WTRU may first synchronize the session to learn the PTO. This scenario may also be used when there is a single flow, (terminated on the controlee WTRU). In this case, any media flows subsequently added to the collaborative session may be synchronized.

Figure 5A:
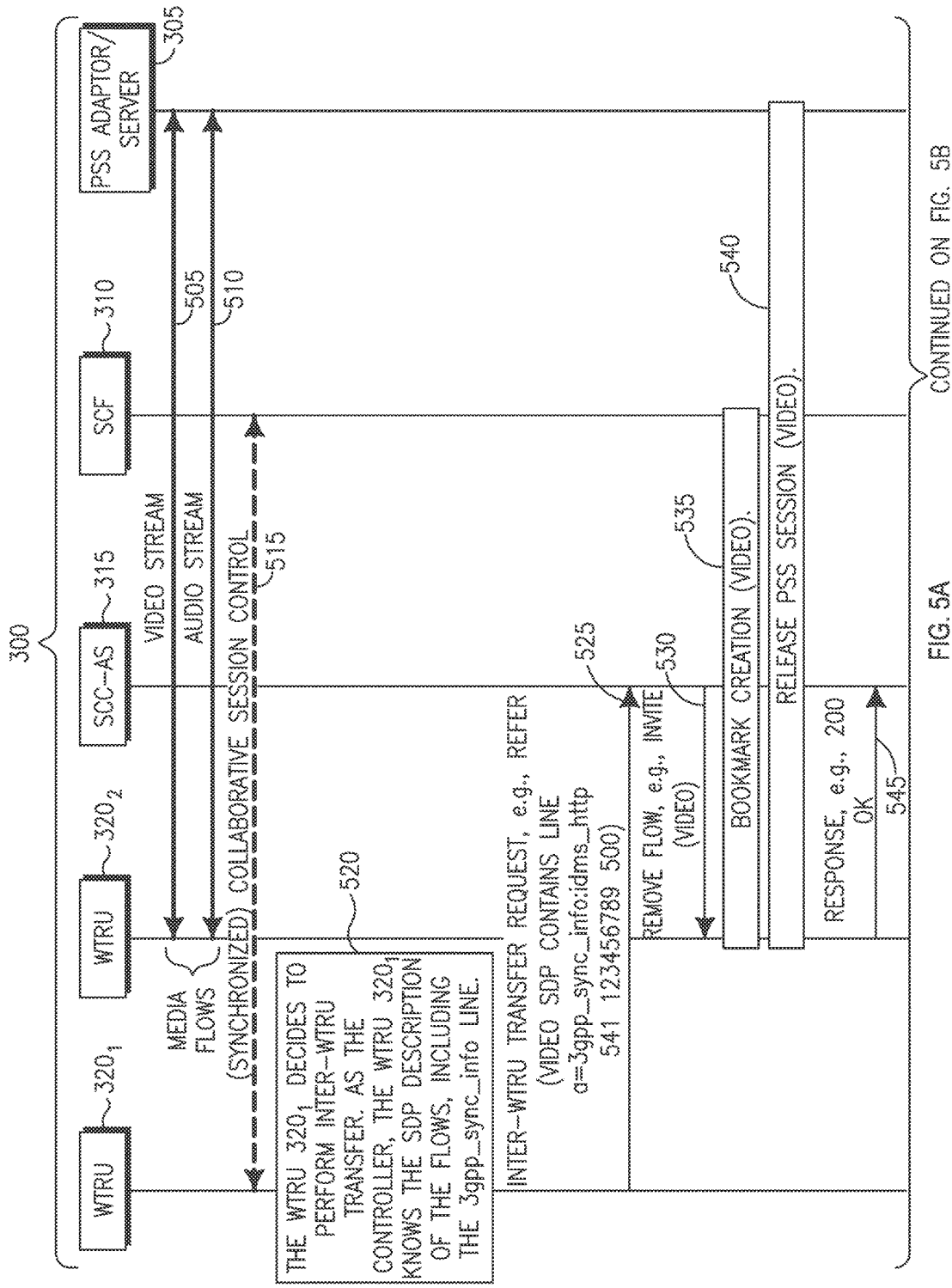
FIGS. 5A and 5B, taken together, show an example communication exchange for transferring a flow within a synchronized session.
Figure 5B:
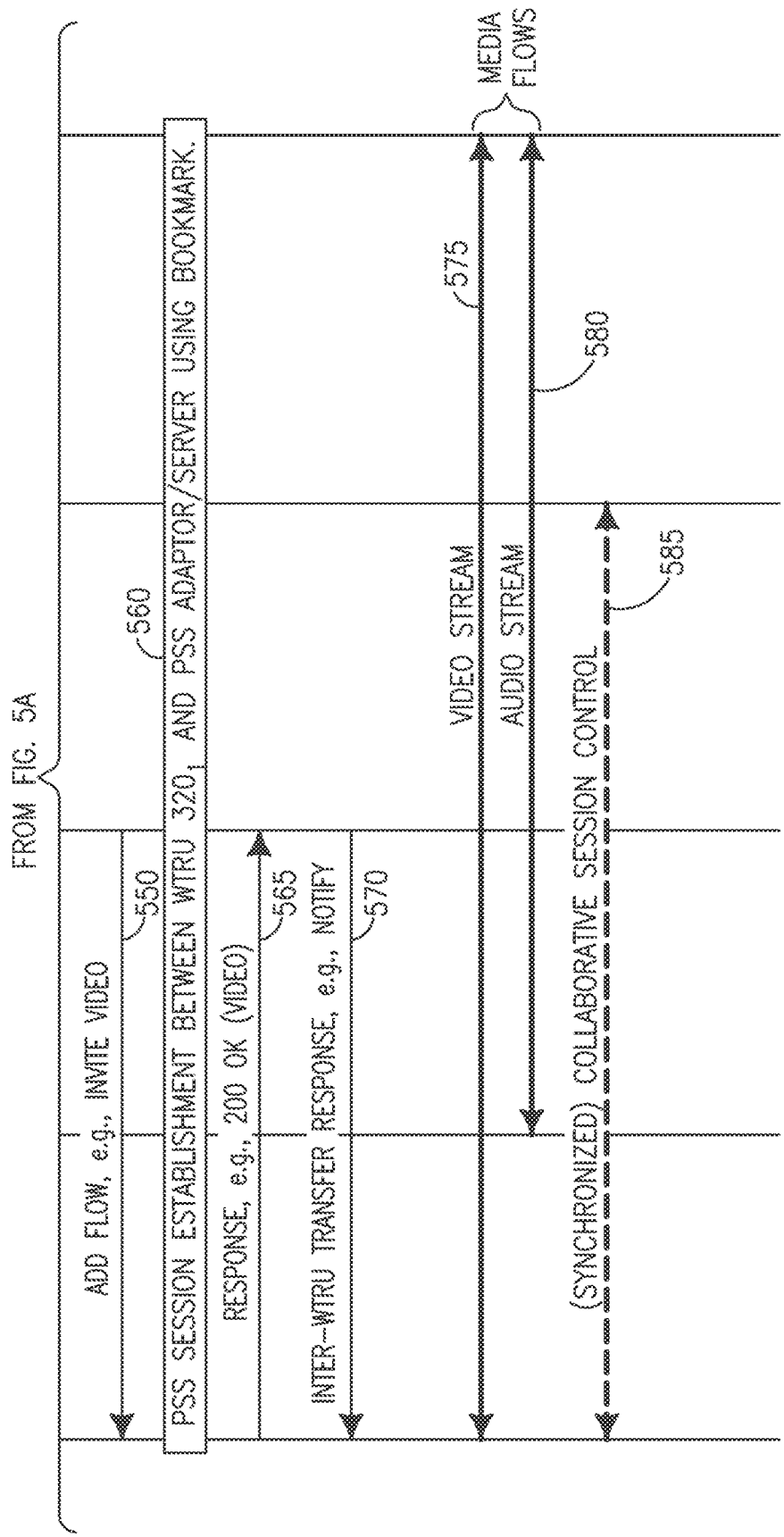

FIGS. 5A and 5B, taken together, show an example communication exchange for transferring a flow within a synchronized session.

As shown in FIG. 5A, a video stream 505 and an audio stream 510, (i.e., media flows), are established between the WTRU $320_2$ and the PSS adapter/server 305, but the WTRU $320_1$ retained control of a synchronized collaborative session 515 through the SCF 310 that was created during a previous inter-WTRU transfer where video and audio streams were transferred from the WTRU $320_1$ to the WTRU $320_2$. The WTRU $320_1$ decides to transfer one flow to itself, while keeping flow presentations of the video and audio streams synchronized (520). As the collaborative session is already synchronized, the WTRU $320_1$ already knows the time synchronization IEs. The WTRU $320_1$ may send an inter-WTRU transfer request 525 to the SCC-AS 315 including the time synchronization IEs. The SCC-AS 315 may initiate the flow transfer by sending a remove flow message 530 which may or may not include the time synchronization IEs since the WTRU $320_1$ already knows the time synchronization IEs.

Referring to FIGS. 5A and 5B, although the time synchronization IEs, they may be present in any one of messages 530 545, 550, 565 and 570 to enable error checking and possibly update the values as an inter-device transfer operation is performed (535, 540, 545, 550, 560 and 565). The WTRU $320_1$ may be notified that its initial inter-WTRU transfer request has been successful via an inter-WTRU transfer response message 570. At the end of the procedure, a video stream 575 is now terminated by the WTRU $320_1$ and an audio stream 580 is terminated by the WTRU $320_2$. The video stream 575 and the audio stream 580 may be synchronized. Thus, a collaborative session 585 is still synchronized, and still controlled by the WTRU $320_1$.

Correcting a loss of synchronization may be required. For example, there may be an existing synchronized collaborative session, wherein a WTRU may detect that it is out of sync (lagging). As a result, the WTRU may request an update of the synchronization. The SCC-AS 315 may accept and update sync on all collaborative session flows, or reset the original PTO on the lagging WTRU (effectively asking this WTRU to "skip" playback to the current position on the other device(s)).

Figure 6A:
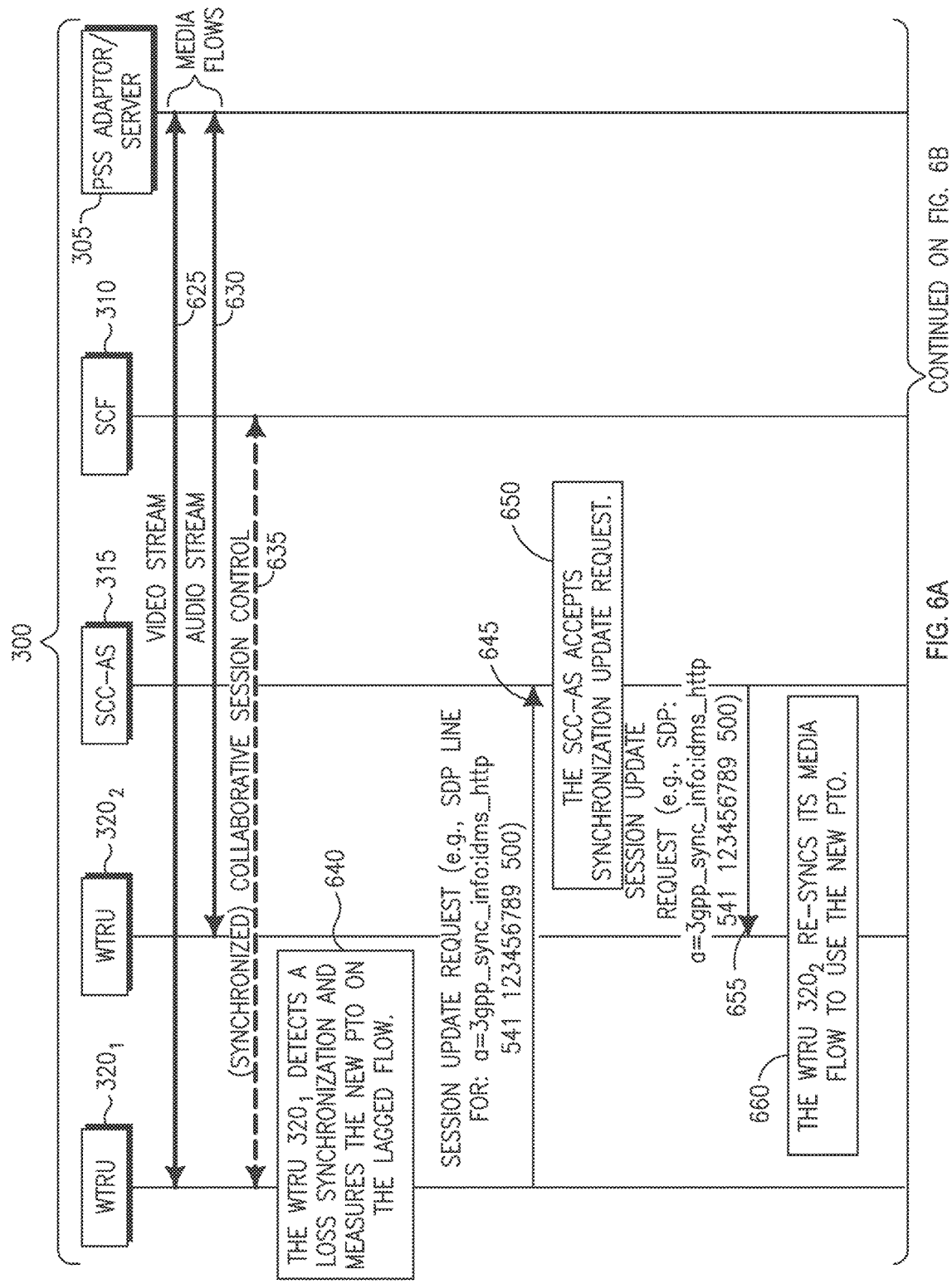

FIGS. 6A and 6B, taken together, show an example communication exchange for correcting a lack of synchronization.

As shown in FIG. 6A, a video stream 625 is established between the WTRU $320_1$ and the PSS adapter/server 305, and an audio stream 630 is established between the WTRU $320_2$ and the PSS adapter/server 305, but the WTRU $320_1$ retained control of a synchronized collaborative session 635 through the SCF 310 that was created during a previous inter-WTRU transfer where the audio stream was transferred from the WTRU $320_1$ to the WTRU $320_2$. In 640, the WTRU $320_1$ may detect a loss of synchronization. For example, this detection may occur when the WTRU $320_1$ performs periodic or continuous measurement of its PTO, and compares it with the PTO of the synchronized collaborative session. A loss of synchronization may be detected if the difference is larger than the specified synchronization tolerance. The WTRU $320_1$ may indicate the loss of synchronization to the SCC-AS 315 by sending a session update request message 645 containing the time synchronization IEs including an updated PTO. In 650, the SCC-AS 315 may accept the synchronization update message 650. In this example, the SCC-AS 315 may decide to align the audio flow presentation with the video flow presentation. Note that other strategies may be implemented as well, (e.g., the SCC-AS 315 may decide to pause and then restart both flows). The SCC-AS 315 may send a session update request message 655 including the updated PTO to the WTRU $320_2$. In 660, the WTRU $320_2$ may adjust its audio presentation to the new offset, (e.g., skip the presentation to a position in the stream).

Referring to FIG. 6B, the WTRU $320_2$ may send back a session update response message 665 to the SCC-AS 315, typically with the same time synchronization IEs to indicate that the re-synchronization was successful. Note that the WTRU $320_2$ may also send modified values, e.g., to indicate it was unable to resynchronize to the requested position in the stream. If this happens, the SCC-AS 315 may, for example, decide to stop the flows and possibly restart from a point earlier in the stream. The SCC-AS 315 may send back a session update response 670 to the WTRU $320_1$ in this example to indicate that the updated time synchronization IEs have been accepted. The WTRU $320_1$ may store this new values in internal state for future use, e.g., to check for synchronization again in the future.

A video stream 675 and an audio stream 680 are now correctly synchronized, and a collaborative session 685 may thus be controlled by the WTRU $320_1$ through the SCF 310, whereby the WTRU $320_1$ may serve as a controller of the synchronized collaborative session 685. The collaborative session 490 may be assigned a new "synchronized" attribute to indicate that all of its media flows are synchronized across all of the WTRUs 320.

The SCC-AS 315 may reject a synchronization update. For example, an incorrect (out of range) PTO value, or too many synchronization updates, may be valid reasons for rejecting a synchronization update. Furthermore, the SCC-AS 315 may re-synchronize by forcing WTRU $320_1$ to use the original PTO, (i.e., the WTRU $320_1$ playback skips to the point where WTRU $320_2$ is playing). The PTO measured on the lagged flow may be reported only when it is stable. No report may be generated for cases when increasing the buffer may not solve the problem, (e.g. loss of connectivity, or insufficient bandwidth to keep up with the flow presentation).

In a collaborative session, there may be cases that require synchronized flows from different media servers flows, different remote legs and in different collaborative sessions to be synchronized together. This may be achieved by synchronizing the media sessions within two different collaborative sessions.

A WTRU acting as a current controller of a collaborative session may perform a new inter-WTRU transfer operation. The result of this operation may be the creation of a new collaborative session, which may be synchronized with the pre-existing collaborative session. For example, the current collaborative session may have an audio media flow to an audio system, and a video media flow to a smartphone. The WTRU may create a collaborative session by adding a new media flow on a television (TV) set (for audio and video), streaming the same content from another media server. The controller WTRU may re-use the time synchronization group ID, (from the pre-existing collaborative session), in the Inter-WTRU transfer request creating the second collaborative session.

Figure 7:
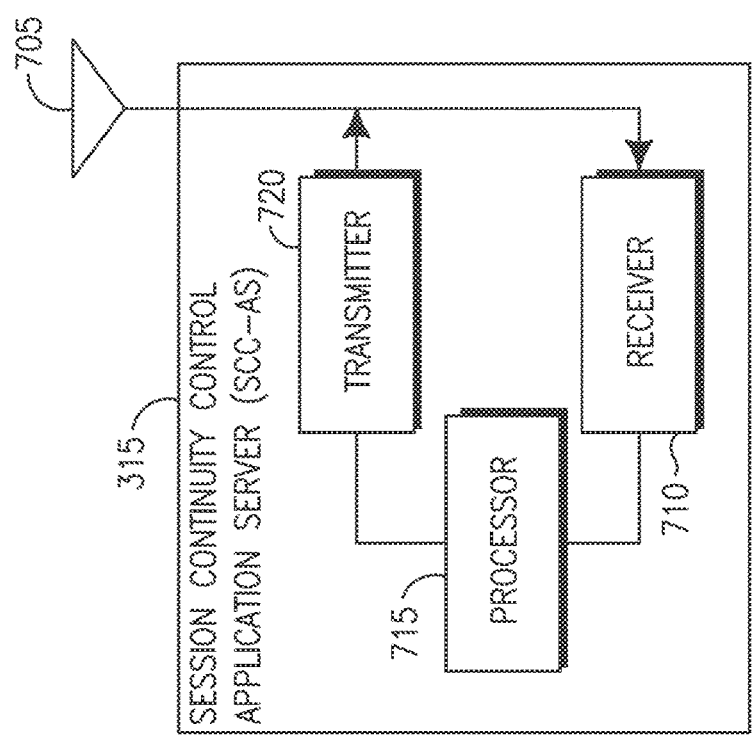
FIG. 7 shows an example block diagram of a session continuity control application server (SCC-AS)

FIG. 7 shows an example block diagram of the SCC-AS 315 used in the wireless communication system 300 of FIGS. 3A, 4A, 5A and 6A. The SCC-AS 315 may include at least one antenna 705, a receiver 710, a processor 715 and a transmitter 720. The receiver 710 may be configured to receive a first inter-WTRU transfer request message from a first WTRU via the at least one antenna 705. The processor 715 may be configured to check for operation authorization based on the received inter-WTRU transfer request message, create a collaborative session and generate a unique media flow group ID. If a synchronization tolerance IE in the first inter-WTRU transfer request message is set to a placeholder (0), the processor 715 may be configured to update the synchronization tolerance IE. The transmitter 720 may be configured to transmit a second inter-WTRU transfer request message including updated time synchronization information to a second WTRU associated with the same collaboration session as the first WTRU via the at least one antenna 705. The receiver 715 may be further configured to receive a first inter-WTRU transfer response message from the second WTRU via the at least one antenna 705. The transmitter 720 may be further configured to transmit a second inter-WTRU transfer response message to the first WTRU via the at least one antenna 705.

The receiver 710 may be further configured to receive a first session update request message from a first WTRU via the at least one antenna 705. The processor 715 may be configured to update an existing collaborative session and generate a unique media flow group ID. If a synchronization tolerance IE in the first session update request message is set to a placeholder (0), the processor 715 may be configured to update the synchronization tolerance IE. The transmitter 720 may be configured to transmit a second session update request message including updated time synchronization information to a second WTRU associated with the same collaboration session as the first WTRU via the at least one antenna 705. The receiver 715 may be further configured to receive a first session update response message from the second WTRU via the at least one antenna 705. The transmitter 720 may be further configured to transmit a second session update response message to the first WTRU via the at least one antenna 705.

Figure 8:
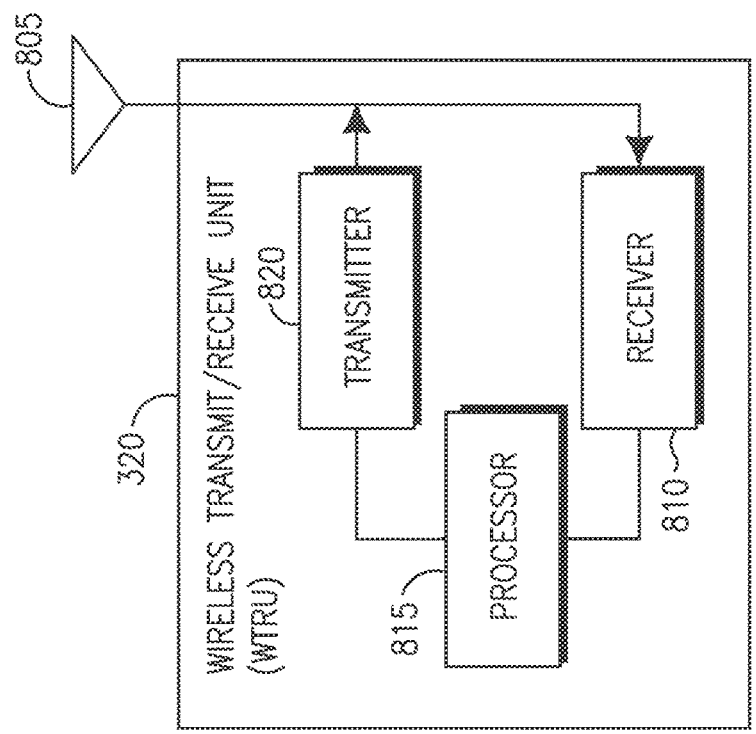
FIG. 8 shows an example block diagram of a WTRU.

FIG. 8 shows an example block diagram of a WTRU 320 used in the wireless communication system 300 of FIGS. 3A, 4A, 5A and 6A. The WTRU 320 may include at least one antenna 805, a receiver 810, a processor 815 and a transmitter 820. The processor 815 may be configured to obtain time synchronization information (e.g., current PTO, synchronization tolerance, media group ID) and generate an inter-WTRU transfer request message including an SDP attribute line that contains a media group ID IE, a PTO IE and a synchronization tolerance IE. The transmitter 820 may be configured to transmit the inter-WTRU transfer request message via the at least one antenna 805. The receiver 810 may be configured to receive an inter-WTRU transfer response message via the at least one antenna 805. The processor 815 may be further configured to update its internal state with updated time synchronization information included in the inter-WTRU transfer response message.

The processor 815 may be further configured to buffer its media flow and later start playback of the media flow when a PTO provided in an inter-WTRU transfer response message is received by the receiver 810.

The processor 815 may be further configured to determine whether to change an existing non-synchronized collaboration session to a non-synchronized session and generate a session update request message including an SDP attribute line that contains a media group ID IE, a PTO IE and a synchronization tolerance IE. The transmitter 820 may be configured to transmit the session update request message via the at least one antenna 805. The receiver 810 may be configured to receive a session update response message via the at least one antenna 805. The processor 815 may be further configured to update its internal state with updated time synchronization information included in the session update response message.

The processor 815 may be further configured to synchronize the media flows of the collaboration session, perform PTO measurements on each of the media flows and generate a combined media flow PTO IE based on the PTO measurements.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method of maintaining a synchronized group session between a first wireless transmit/receive unit (WTRU) and a second WTRU, the method comprising:
   receiving, by the first WTRU, synchronization information from a Service Centralization and Continuity Application Server (SCC AS), wherein the synchronization information includes at least a synchronization tolerance;
   determining, by the first WTRU, that the first WTRU is no longer synchronized with the second WTRU based at least on the synchronization tolerance; and
   initiating a re-synchronization process based on the determination that the first WTRU is no longer synchronized with the second WTRU.

2. The method of claim 1 further comprising sending, by the first WTRU, a message to the SCC AS to begin the re-synchronization process.

3. The method of claim 1 wherein the synchronization information includes a presentation time offset (PTO).

4. The method of claim 1 wherein the synchronization information includes a group identity (ID).

5. The method of claim 1 wherein the re-synchronization process enables the second WTRU to re-synchronize.

6. The method of claim 5 wherein the re-synchronizing of the second WTRU uses a new presentation time offset (PTO) measured by the first WTRU.

7. The method of claim 1 further comprising receiving, by the first WTRU, a session update response from the SCC AS.

8. A wireless transmit/receive unit (WTRU) for maintaining a synchronized group session with a second WTRU, the WTRU comprising:
a receiver configured to receive synchronization information, wherein the synchronization information includes at least a synchronization tolerance; and
a processor configured to determine that the WTRU is no longer synchronized with the second WTRU based at least on the synchronization tolerance and to initiate a re-synchronization process based on the determination that the WTRU is no longer synchronized with the second WTRU.

9. The WTRU of claim 8 wherein the synchronization tolerance is provided to the WTRU by a Service Centralization and Continuity Application Server (SCC AS).

10. The WTRU of claim 9 further comprising a transmitter configured to send a message to the SCC AS to initiate the re-synchronization process.

11. The WTRU of claim 8 wherein the synchronization information includes a presentation time offset (PTO).

12. The WTRU of claim 8 wherein the synchronization information includes a group identity (ID).

13. The WTRU of claim 8 wherein the re-synchronization process re-synchronizes the second WTRU.

14. The WTRU of claim 13 wherein the re-synchronizing of the second WTRU uses a new presentation time offset (PTO) measured by the WTRU.

15. The WTRU of claim 8 wherein the receiver is configured to receive a session update response from a Service Centralization and Continuity Application Server (SCC AS).

16. A network device for maintaining a synchronized group session between a first wireless transmit/receive unit (WTRU) and a second WTRU, the network device comprising:
a transceiver; and
a processor operatively coupled to the transceiver, the processor and the transceiver configured to:
transmit synchronization information to the first WTRU, wherein the synchronization information includes at least a synchronization tolerance;
identify that the first WTRU is no longer synchronized with the second WTRU based at least on the synchronization tolerance; and
initiate a re-synchronization process based on the identification that the first WTRU is no longer synchronized with the second WTRU.

17. The network device of claim 16 wherein transceiver and processor are further configured to receive a message from the first WTRU to initiate the re-synchronization process.

18. The network device of claim 16 wherein the synchronization information includes a presentation time offset (PTO) and a group identity (ID).

19. The network device of claim 16 wherein the re-synchronization process re-synchronizes the second WTRU.

20. The network device of claim 16, wherein the network device comprises a Service Centralization and Continuity Application Server (SCC AS).

* * * * *